United States Patent [19]

Mitchell et al.

[11] Patent Number: 5,995,113
[45] Date of Patent: Nov. 30, 1999

[54] COLORING EVENTS IN EVENT STREAMS IN ORDER TO PROVIDE INFORMATION ABOUT OPERATION OF A SOFTWARE LIBRARY

[75] Inventors: Kathryn L. Mitchell; Michael J. Bialek, both of Corvallis, Oreg.

[73] Assignee: Hewlett-Packard Company, Palo Alto, Calif.

[21] Appl. No.: 08/691,973

[22] Filed: Aug. 2, 1996

[51] Int. Cl.⁶ .................................................. G06T 11/00
[52] U.S. Cl. ............................................................ 345/440
[58] Field of Search ...................................... 345/440, 339

[56] References Cited

U.S. PATENT DOCUMENTS

| 5,649,085 | 7/1997 | Lehr ......................................... 345/440 |
| 5,790,819 | 8/1998 | Rosenburg et al. ..................... 345/339 |

FOREIGN PATENT DOCUMENTS

| 0646868A1 | 9/1994 | European Pat. Off. ........ G06F 11/32 |
| 0654735A1 | 11/1994 | European Pat. Off. ........ G06F 11/00 |

OTHER PUBLICATIONS

Lehr T. et al.: "Visualizing Performance Debugging", Computer, vol. 22 No. 10, Oct. 1, 1989, pp. 38–51.

"Improving Performance of Visual Trace Analysis Using Abstract Time–Lines", IBM Technical Disclosure Bulletin, vol. 38, No. 3, Mar. 1, 1995, pp. 281–284.

D. Jerding, et al. "The Information Mural", Graphics, Visualization, and Usability Center, College of Computing, Georgia Institute of Technology, Technical Report GIT–GVU–96–xxMar. 1996.

T. Ball, et al. "Software Visualization in the Large", Computer, Apr. 1996, pp. 33–42.

*Primary Examiner*—Almis R. Jankus

[57] ABSTRACT

Information is provided about operation of a software library accessed by an application program. Information about calls made by the application program into the software library is collected, for example, by capturing a trace of the calls. For a user selected portion of the calls a plurality of event streams are displayed. Within the event streams, events are colored so that a color of each event displayed in each event stream encodes information about a call associated with the event. A first call is represented as a separate event in each event stream in the plurality of event streams and coloring within each event stream encodes different information about the first call.

26 Claims, 13 Drawing Sheets

(9 of 13 Drawing Sheet(s) Filed in Color)

COLORING EVENTS IN EVENT STREAMS IN ORDER TO PROVIDE INFORMATION ABOUT OPERATION OF A SOFTWARE LIBRARY

BACKGROUND

The present invention concerns software tools which facilitate the analysis of the behavior of libraries accessed by an application through an application programming interface (API), for instance a three dimensional (3D) graphics library, and pertains particularly to a tool that utilizes color coded graphical representations of API events organized within a dynamic framework having a particular set of characteristics.

Analyzing the behavior of a sequential process, such as a software library, is difficult. Many approaches have been taken to solve the problems inherent in such analysis. For example, in the hardware domain, logic analyzers which are used to instrument nodes and which treat logic transitions as "events".

Utilizing a 3D graphics library to develop a high performance 3D graphics application can be an extremely complex task. In order to achieve optimal performance of the graphics application, it is often required that a developer have an intimate knowledge of the graphics library which underlies the graphics application and into which the graphics application makes calls. Various tools have been developed in order to help developers effectively utilize graphics libraries.

For example, Silicon Graphics Inc., has made available a number of graphics performance analysis tools. These include, for example, the glprof analysis tool, the gldebug analysis tool, the ogldebug analysis tool, and Iris Performer tools. Using the glprof analysis tool it is possible to capture the IRIS GL application programming interface (API) calls used to generate a single image into a trace. IRIS GL graphics library is a 3D graphics library available from Silicon Graphics, Inc. The generated traces are stored in trace files. The traces may be replayed to re-render the graphics image. Also, different graphics configurations can be simulated to predict the utilization of the different stages of the graphics pipeline when replaying the trace for these different configurations. Additionally, a limited set of rendering options can be overridden from the glprof analysis tool so that calls made in a captured trace can be ignored. The captured traces can also be replayed and timed to determine the maximum performance possible for the trace.

The gldebug analysis tool monitors IRIS GL API calls made by a graphics application. From these monitored calls, visual and textual representations of the current graphics state is shown. Also, using the gldebug analysis tool, API calls made by the graphics application can be saved in a C formatted file. Additionally, breakpoints can be set on API calls. If an appropriate debugger is active, the application source code will be shown for the breakpoint. Further, the gldebug analysis tool allows a user to select API calls to skip.

The ogldebug analysis tool operates similar to the gldebug analysis tool, but is used for the OpenGL API. OpenGL graphics library is a 3D graphics library product available from Silicon Graphics, Inc. Using the ogldebug analysis tool, API calls made by the graphics application are monitored. Textual representation of the current graphics state can be shown. Additionally, performance hints can be generated and information about graphics display lists can be generated.

For Iris Performer tools, also available from Silicon Graphics, Inc., instrumentation is built into the Iris Performer toolkit. This allows for the generation of numerous graphs and statistics. When using the Iris Performer tools, information is displayed in real time. No trace files are generated. Additionally, a user can change the color of specific primitives to highlight the screen size and locations of these primitives in the rendered image. In general, a primitive is a call into a graphics library which results in a particular shape being drawn on a display.

SUMMARY OF THE INVENTION

In accordance with the preferred embodiment of the present invention, information is provided about operation of a software library accessed by an application program. Information about calls made by the application program into the software library are collected, for example, by capturing a trace of the calls. For a user selected portion of the calls a plurality of event streams are displayed. Within the event streams, events are colored so that a color of each event displayed in each event stream encodes information about a call associated with the event. A first call is represented as a separate event in each event stream in the plurality of event streams and coloring within each event stream encodes different information about the first call.

For example, in one preferred embodiment of the present invention, all the calls are application programming interface (API) calls from a graphics application to a graphics library. Also, in a preferred embodiment, an order of events in each event stream corresponds to an order of calls made by the application program into the software library. The separate events in each event stream which represent the first call are vertically aligned so that the viewer can easily identify the location of all the event information displayed for the first call.

The event streams can be used to display a wide diversity of information. For example, in one event stream, coloring of events can indicate information about attributes of calls represented by the events. These attributes are, for example, a class of the call. In another event stream, coloring of events can indicate information about attributes of parameters for calls, for example, the number of vertices in a primitive. In another event stream, coloring of events can indicate information about attributes of a state of the software library resulting from calls represented by the events. For example, the coloring might indicate redundantly set attributes. In another event stream, coloring of events can indicate information about attributes of behavior of the graphics library when receiving calls represented by the events. For example, the coloring might indicate scheduling path for a primitive.

Some of the event streams can be arranged to provide hierarchical information about the calls. For example, in the case where the application is a graphics application and the first software library is a graphics library, coloring of events in a first event stream can indicate classes of calls, where one of the classes is, for instance, primitives, represented by the events in the first event stream. Coloring of events in a second event stream can be according to subclass, for example, indicating particular types of primitives.

In a preferred embodiment of the present invention, the portion of the calls for which a plurality of event streams is displayed is user selectable and user variable. Width of the events within the event streams also may be user variable. For example, each event within the plurality of event streams is of uniform width. Alternatively, each event is graphically represented with a width proportional to processing time of a call represented by the event, the processing time including processing time within the graphics library but not including processing time within the graphics application. Alternatively, each event is graphically represented with a width proportional to processing time of a call represented by the event, the processing time including processing time within the graphics library and including processing time within the graphics application.

In order to provide more information to a user, labels for the event streams may be displayed which indicate what information is being represented by each event stream. Also, in a preferred embodiment, a legend of colors for one or more of the event streams can be displayed. Additionally, in a text section, text describing at least some of the portion of the calls can be displayed. For example, in response to a user selecting a first event within a first event stream, a call represented by the event is displayed in text format.

The present invention provides a developer access to information about the behavior of a software library that would not otherwise be accessible. In addition, the information is presented to the user in such a way that it is easy to navigate through and interpret, providing insight that will enable the user to optimize the use of the software library, and hence the performance of the intended function of an application program.

BRIEF DESCRIPTION OF THE DRAWINGS

The file of this patent contains at least one drawing executed in color. Copies of this patent with color drawings (s) will be provided by the Patent and Trademark Office upon request and payment of the necessary fee.

DESCRIPTION OF THE PREFERRED EMBODIMENT

Figure 1:
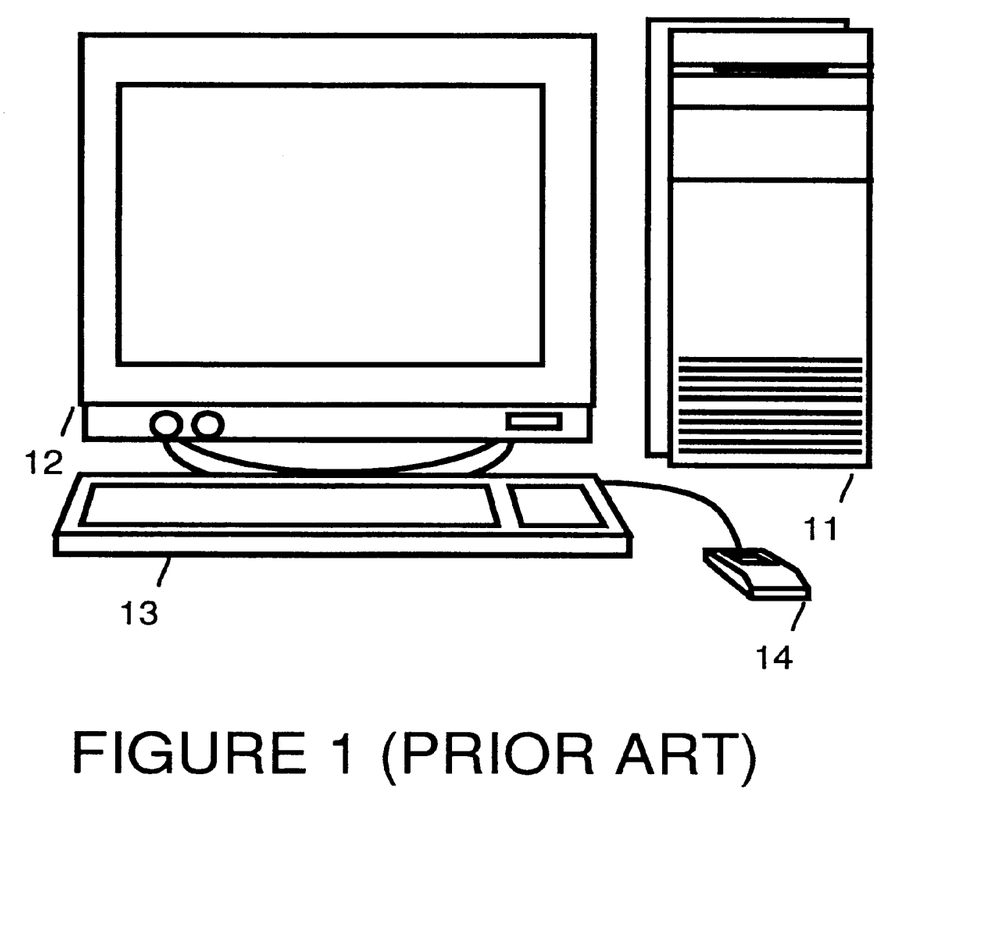
FIG. 1 is a block diagram of a computer system.

FIG. 1 shows a computing system which acts as a graphics work station. The computing system includes a housing 11 for various processing units within the computing system, a monitor 12, a keyboard 13 and a pointing device 14.

Figure 2:
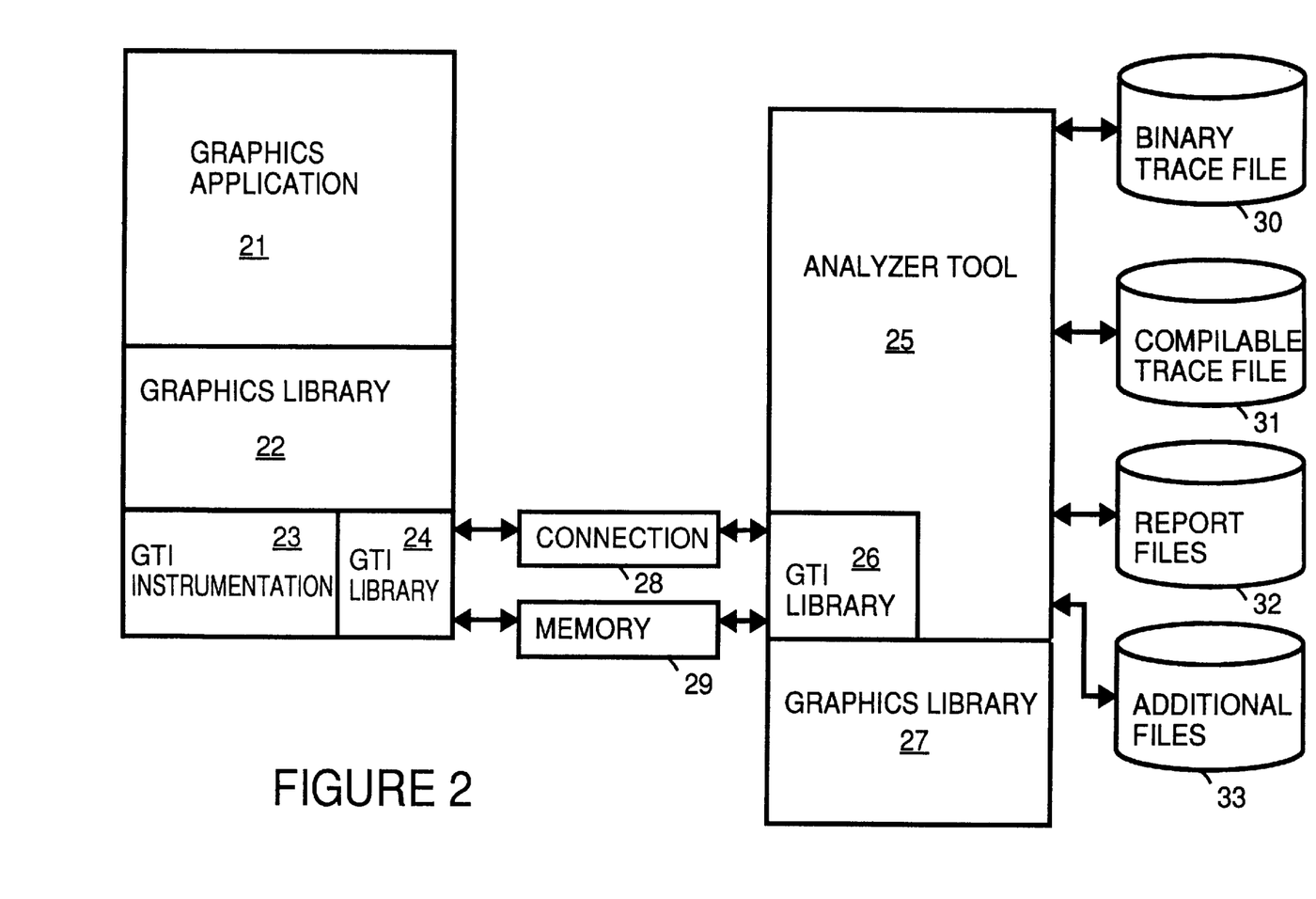
FIG. 2 is a block diagram which illustrates interaction between a graphics application and an analyzer tool in accordance with a preferred embodiment of the present invention.

FIG. 2 is a block diagram which illustrates interaction between a graphics application 21 and an analyzer tool 25 within the computer system shown in FIG. 1. Graphics application 21 is, for example, an HP Model Viewer graphics application available from Hewlett-Packard Company, or some other graphics application such as a program to do mechanical part design or architectural engineering.

Graphics application 21 makes calls to a graphics library 22. For example, graphics library is a Starbase graphics library available from Hewlett-Packard Company, having a business address of 3000 Hanover Street, Palo Alto, Calif. 94304, or an OpenGL graphics library available from Silicon Graphics, Inc. Into graphics library 22 is added graphics tool interface (GTI) instrumentation 23. GTI instrumentation 23 is code which is added to graphics library 22 to capture information regarding the execution of code within graphics library 22. GTI instrumentation 23 writes data events to analyzer tool 25, as further described below. GTI instrumentation 23 also reads control events generated by analyzer tool 25. The control events specify what data events should be sent to analyzer tool 25. The control events indicate this by specifying what portions of GTI instrumentation 23 should be enabled, when the portions of GTI instrumentation 23 should be enabled and for how long the portions of GTI instrumentation should be enabled.

A GTI library 24 and a GTI library 26 contain functions which are accessed by graphics library 22 and analyzer tool 25 to establish the connection between analyzer tool 25 and graphics library 22. GTI library 24 and GTI library 26 also contain functions to read and write GTI events.

Communication between graphics library 22, through GTI library 24, and analyzer tool 25, through GTI library 26, is done via a connection 28 and shared memory 29. For example, connection 28 is a standard UNIX (TCP/IP) socket connection. Alternatively, some other type of connection may be used.

Shared memory 29 is, for example, a standard UNIX shared memory block which is used to establish connection between graphics library 22 and analyzer tool 25. Graphics application 21 registers itself in shared memory so that analyzer tool 25 knows with which process corresponding to graphics application 21/graphics library 22 analyzer tool 25 can establish connection. Similarly, analyzer tool 25 registers itself in shared memory so graphics application 21/graphics library 22 knows which socket will be used for communication with analyzer tool 25.

Analyzer tool 25 provides to a developer (user) the ability to determine how graphics application 21 is utilizing graphics library 22. Analyzer tool 25, as further described below, allows for real time monitoring of graphics performance as well as post processing of collected traces. All communication between graphics library 22 and analyzer tool 25 is done via GTI library 24 and GTI library 26, as described above.

Analyzer tool 25 uses a binary trace file 30 to store in binary form traces (consisting of data events received from graphics library 22). After traces have been captured in binary trace file 30, the traces can be written out to a compilable trace file 31 to be viewed or compiled by a user at a later time.

Analyzer tool 25 writes to compilable trace file 31 by converting API events (a type of data event described below) into C programming language statements which can be compiled. For example, when analyzer tool 25 captures and converts into compilable trace file 31 API events for all graphics API calls made from graphics application 21 to graphics library 22 used to construct an image, then the resulting C programming language statements written in compilable trace file 31 can be compiled and executed to generate the same image constructed by graphics application 21.

Analyzer tool 25 additionally uses other files. For example report files 32 are used to store text files which provide various report information to a user. Additional files 33, for example, include help files, resource files and configuration files utilized by analyzer tool 25.

Figure 3:
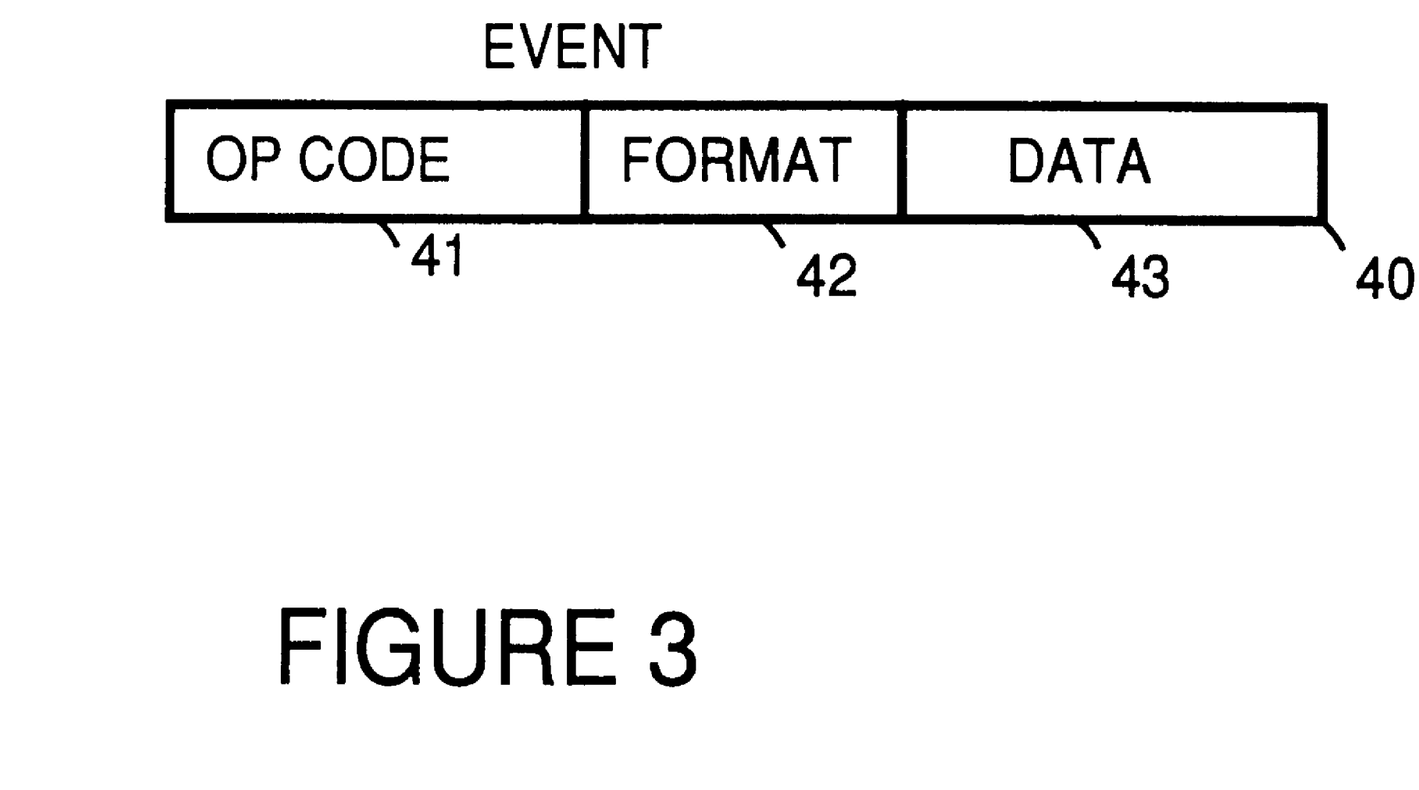
FIG. 3 shows structure of an event in accordance with a preferred embodiment of the present invention.

FIG. 3 shows the typical structure for a GTI event 40. Each GTI event 40 (whether a data event or a control event) has an operation (op) code 41. Op code 41 is an integer value that allows analyzer tool 25 and graphics library 22 to recognize and use the GTI event.

Additionally, each GTI event 40 also has a format string 42. Format string 42 is used to encode the parameters (if present) that are being passed with event 40. Different characters within format string 42 are used to represent the fundamental data types of the parameters. Special encodings are used for complex data structures and arrays. For example, Table 1 below gives examples of characters for format strings and their associated data types.

TABLE 1

| Format String | Data Type |
|---|---|
| ii | GTI event has two 32 bit integer parameters |
| ff | GTI event has two 32 bit floating point values |
| v | GTI event has one parameter of void type, two values are passed with void types, the size of the void type and the contents of the void type. Void types are used to send data structures that have more than one element. |
| *I | GTI event has an array of unsigned 16 bit integers. Two sets of values are passed with this event. The first is the number of elements in the array. The second are the array elements. |

A GTI event may have zero parameters associated with it. In this case format string 42 will be an empty string and no data will be passed with the GTI event.

As discussed above, data events are written from graphics library 22 (shown in FIG. 3) back to analyzer tool 25. Data events are, for example API events, timing events or monitor events.

An API event indicates an API call, including data from API parameters, which is sent from graphics application 21 to a graphics routine within graphics library 22. In order to forward API events to analyzer tool 25, instrumentation is added to the beginning of a graphics routine. The instrumentation, when enabled, will forward an identifier of the API call, including the parameters, to analyzer tool 25 when the graphics application 21 makes an API call to the graphics routine within graphics library 22.

Timing events contain information which allows analyzer tool 25 to determine how much time was spent in a graphics routine within graphics library 22, and how much time was spent in graphics application 21 between API calls to graphics library 22.

Monitor events, when enabled, are events sent when only minimal instrumentation is enabled within graphics library 22. Monitor events provide accurate performance measurement information with the generation of monitor events producing only a nominal performance penalty of the graphics library routines. For example, a frame rate event is a monitor event which, when enabled, is written only once per graphics application generation of a frame (image) for display on monitor 12. The frame rate event allows analyzer tool 25 to determine the frame rate (images drawn per unit time) that is being achieved by graphics application 21.

Control events are generated by analyzer tool 25 and sent to graphics library 22. There are two types of control events: event selection events and trigger events.

Event selection events enable GTI instrumentation in graphics library 22. Analyzer tool 25 can enable instrumentation based on the op codes of the data events the analyzer tool wishes to receive from graphics library 22. For example, if analyzer tool 25 desires to receive a data event from graphics library 22 for every graphics API call made by graphics application 21 to graphics library 22, analyzer tool 25 enables op codes for every data event which represents a graphics API call from graphics application 21 to graphics library 22. The resulting trace can be stored (as described above) and used by analyzer tool 25 to generate (i.e., render) the image (as illustrated below).

Trigger events control when and for how long graphics library 22 will generate data events. In the preferred embodiment of the present invention, there are three types of trigger events: manual trigger events, time trigger events and frame trigger events.

A manual trigger event tells graphics library 22 to start generating data events as soon as the manual trigger event is received. A second manual trigger event will be sent by analyzer tool 25 to tell graphics library 22 when to stop generating the data events.

A time trigger event tells graphics library 22 to start generating data events as soon as the time trigger event is received. The time trigger event contains one parameter that indicates for how long graphics library 22 should generate data events.

A frame trigger event has two parts. The first part is the frame definition. The second part of the frame trigger event is the frame trigger itself. A frame trigger definition consists of a starting API call and an ending API call. The op codes used for the API calls are used to specify the starting and ending calls. A frame trigger event has two parameters. The first parameter indicates the number of frames to skip before data events are generated. The second parameter indicates the number of frames for which to generate data events.

Table 2 below gives a pseudo code example of instrumentation (i.e., a portion of GTI instrumentation 23) added to a graphics routine (GraphicsRoutine) within graphics library 22.

TABLE 2

```
GraphicsRoutine (Parameters . . . )
Begin Routine
/*** Instrumentation placed at the beginning of the routine follows***/
    if INSTRUMENTATION ENABLED
        read time
        if API INSTRUMENTATION ENABLED
            write GTI API event for GraphicsRoutine    /*** this line of
                                                            code, when
                                                            enabled, sends an
                                                            API event to
                                                            analyzer tool
                                                            25 ***/
        read time
/*** The graphics function is performed here ***/
    Perform non-instrumentation work
/*** Instrumentation placed at the end of the routine follows***/
    if INSTRUMENTATION ENABLED
        read time
        if TIMING INSTRUMENTATION ENABLED
            write GTI TIMING event for                 /*** this line of
            GraphicsRoutine                                 code, when
                                                            enabled, sends a
                                                            timing event to
                                                            analyzer tool
                                                            25 ***/
        read time
End Routine
```

Figure 4:
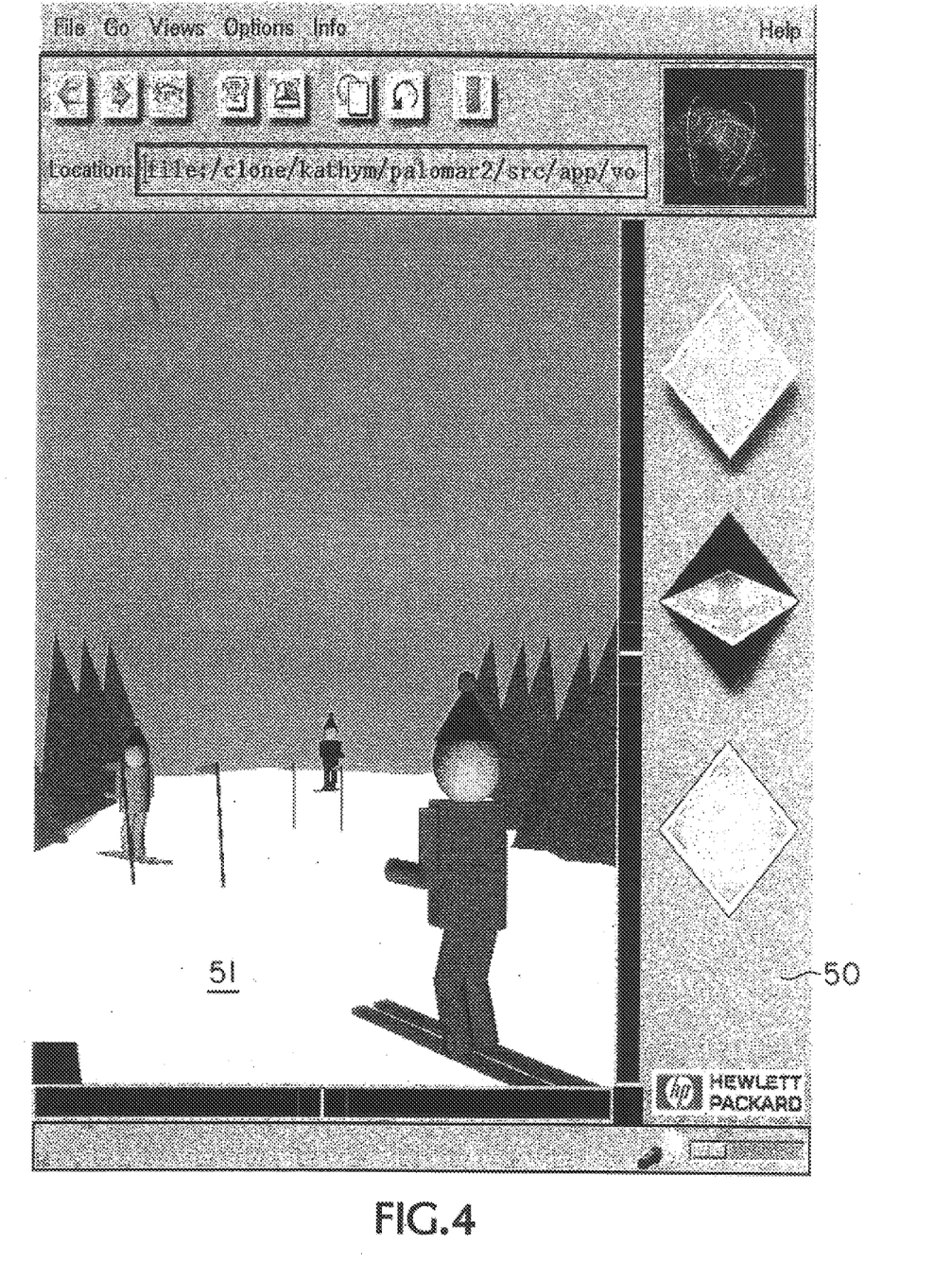
FIG. 4 shows a display of a graphics application.

FIG. 4 shows a display window 50 generated by graphics application 21 and shown on monitor 12. Display window 50 is generated, for example by an HP Model Viewer graphics application available from Hewlett-Packard Company. Graphics application 21 uses graphics library 22 to generate a three-dimensional image 51 within display window 50.

Figure 5:
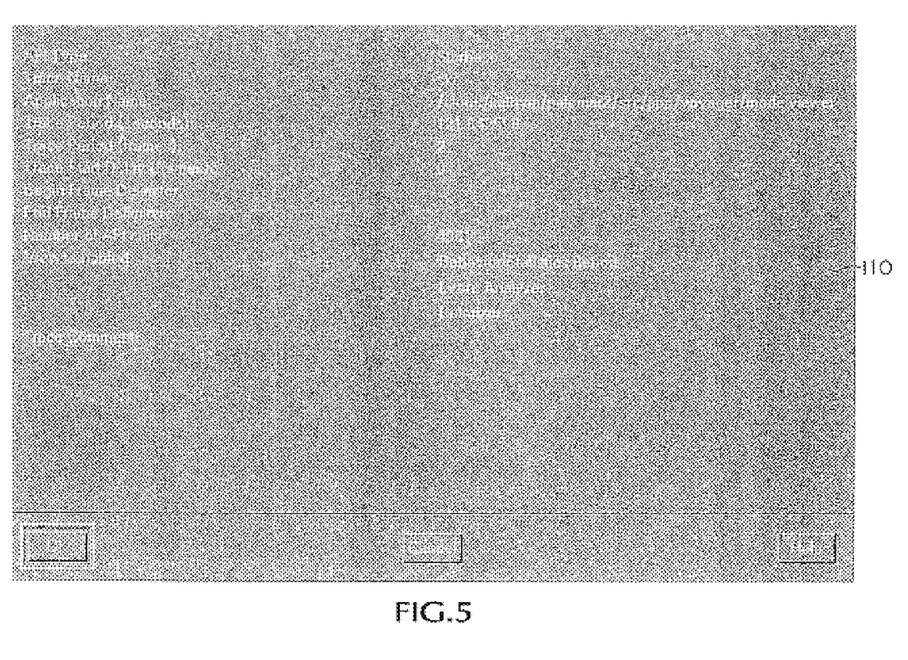
FIGS. 5, 6, 7, 8, 9, 10, 11 and 12 show displays generated by an analyzer tool which utilizes color to graphically present information about generation of an image, in accordance with a preferred embodiment of the present invention.

FIG. 5 shows a trace information dialog box 110. Within trace information dialog box 110 there is shown various information including the API type, a trace name, an application name, the trace period, the number of API calls and the views enabled. As can be seen from trace information dialog box 110, more than one view may be enabled at a time.

Figure 6:
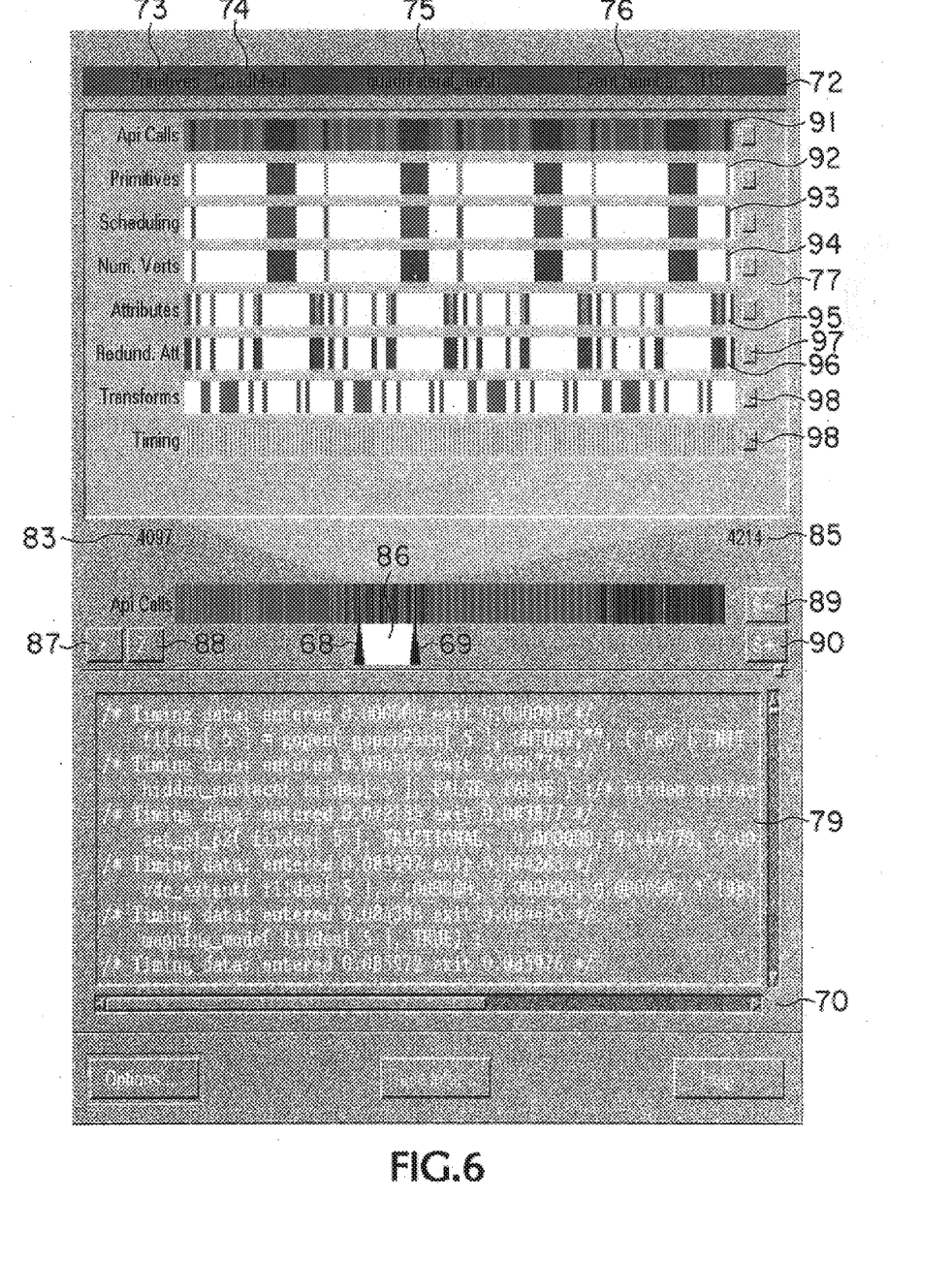

FIG. 6 shows a window 70 for an event analyzer view of the image shown in FIG. 4. Within a text view section 79 a textual representation of the event stream is shown. A reference stream 78 of API calls gives a colorized reference stream for API calls made from graphics application 21. Each color indicates for each event what type of API call is made.

A data event stream window 77 shows various graphical representations of event steams which occur within a region of interest 86 of API of reference stream 78. Colors for each event provide information about each event within each event stream shown in data event stream window 77. Events represented within each event stream shown in data event stream window 77 are aligned with the same events as represented in all the other event streams shown in data event stream window 77. This allows a user to obtain information on a particular event, as color coded information for the event in different event streams is vertically aligned within data event stream window 77. As can be seen from a first event number 83 and a last event number 85 located at the bottom of data event stream window 77, the API calls represented within data event stream window 77 include the API calls numbered 4097 to 4214.

An API call event stream 91 represents API call events within region of interest 86. In API call event stream 91, the API calls are color coded by class. A legend of colors for call event stream 91 appears in FIG. 8, discussed below. A primitive event stream 92 represents primitive calls within region of interest 86 which are made from graphics application 21 to graphics library 22. In primitive event stream 92, the primitives are color coded by sub-class. A legend of colors for call event stream 92 appears in FIG. 8, discussed below.

A scheduling event stream 93 represents scheduling path of primitive calls within region of interest 86 for primitives made from graphics application 21 to graphics library 22. In scheduling event stream 93, the colors indicate scheduling path information within graphics library 93. For example, the scheduling path categories represented by various colors are "general path", "streamline path", and "geometry accelerated path".

A number of vertices event stream 94 represents the number of vertices of a part of an image rendered by primitive calls within region of interest 86 for primitives made from graphics application 21 to graphics library 22. In number of vertices event stream 94, the colors indicate the number of vertices.

An attributes event stream 95 represents the setting of attributes of API calls within region of interest 86. A legend of colors for call event stream 95 appears in FIG. 8, discussed below. A redundant attributes calls 96 indicates whether attributes have been set redundantly. Attributes are considered to be redundant set whey they are set to the same value they had previously.

A transform event stream 97 represents the type of transform performed within region of interest 86. Transformations are used to specify the size, location and orientation of a primitive. A timing line 98 shows the duration of an API call and the time between API calls.

When a user places a cursor 71 over an API call in API call event stream 91, information about the API call appears in a global legend 72. Global legend 72 includes a specification 73 of the type of information being color coded, a specification 74 of the particular category within this type applicable to this API call, a specification 75 of the specific API call instruction that was executed and an event number 76 which indicates the position of this event relative to the beginning of the trace.

A caliper 68 and a caliper 69 are provided which allow the user to "zoom" in on a region of interest 86. A user activates a caliper by using mouse 14 to move cursor 71 on top of the caliper, then pressing a mouse button. The caliper can then be moved to the left or right. The view in the data event stream window 77 is then updated so that only events between calipers 68 and 69 are displayed, and these events are displayed across the original width of each event stream 92 through 97, effectively increasing the width of events. Left caliper 68 and right caliper 69 can be controlled independently. Also, by selecting region of interest 86 between calipers 68 and 69, the user can move region of interest 86 left or right, maintaining the same width between calipers 68 and 69.

A "Zoom In" button 88 causes calipers 68 and 69 to move to the left and right edges of reference event stream 78. By repeatedly moving in calipers 68 and 69, then "Zooming In", the user can get a magnified view of a portion of data event streams 91 through 98, allowing the user to "see" events in large traces.

A "Zoom Out" button 87 causes reference event stream 78 to display the entire stream. Calipers 68 and 69 continue to point at the same events that they did previously, i.e., calipers 68 and 69 move to define where within reference entire stream 78 current region of interest 86 is located. Data event streams 91 through 98 remain unchanged.

The user may select an event by passing cursor 71 over the event and pressing a mouse button. The user may move the selected event forward one event by selecting S+ button 90. The user may move the selected event backward one event by selecting S− button 89. If the selected event is already at the beginning or end of the trace, respectively selecting S+ button 90 or S− button 89 will have no effect.

As mentioned above, upon a user pressing a button on mouse 14 while cursor 71 is over an event within data event stream window 77, the event becomes selected. Selection of an event is illustrated in FIG. 7.

Figure 7:
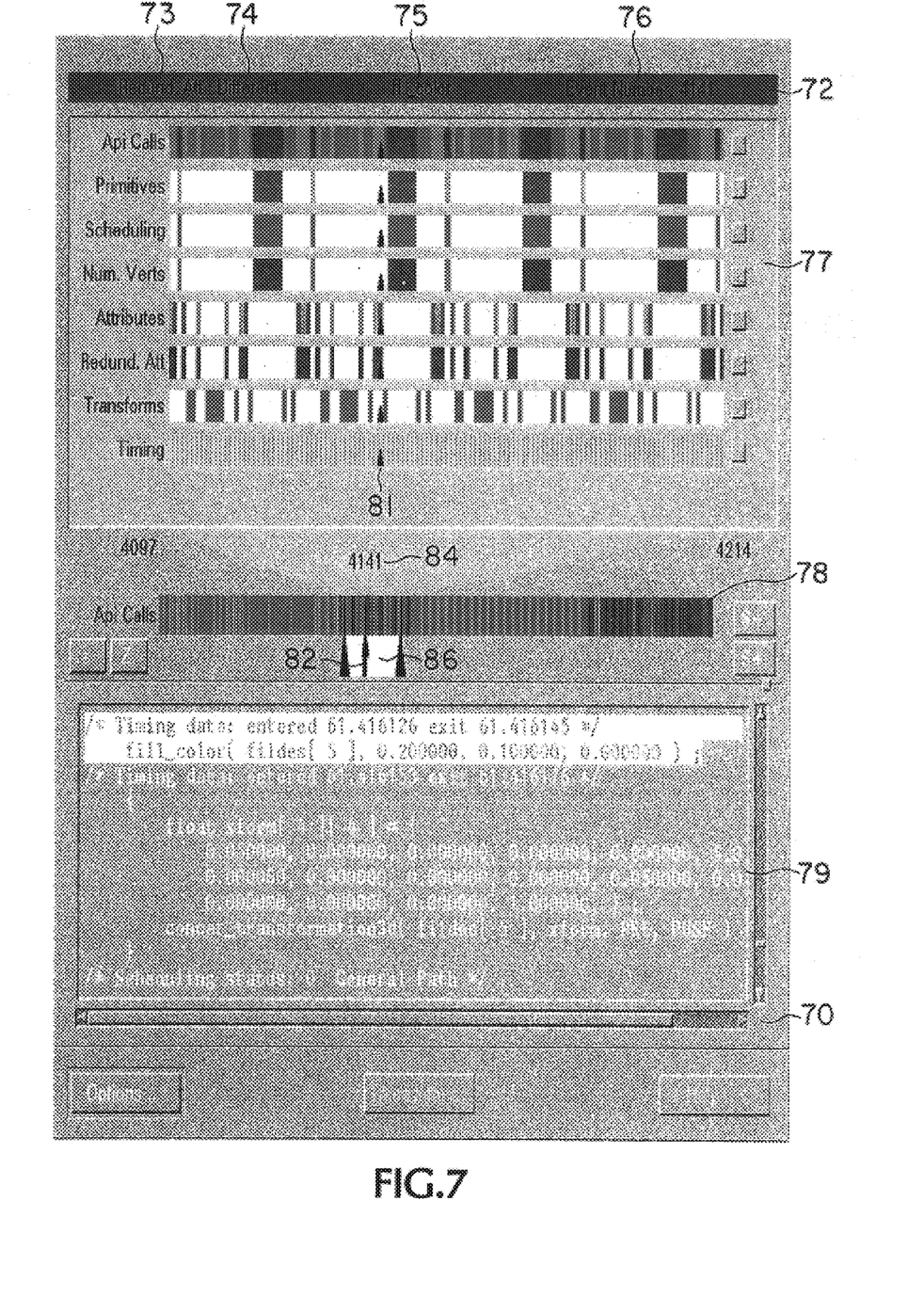

In FIG. 7, the selected event is highlighted in text view section 79. A marker 82 points to the location of the selected event within reference stream 78. Markers 81 point to the location of the selected event within each event stream shown within data event stream window 77. Additionally a selected event number 84 appears between first event number 83 and last event number 85.

At the end of each event stream representation in data event stream window 77 is a legend toggle button. Selection of this legend toggle button causes a legend for the event stream to appear. This is illustrated by FIG. 8.

Figure 8:
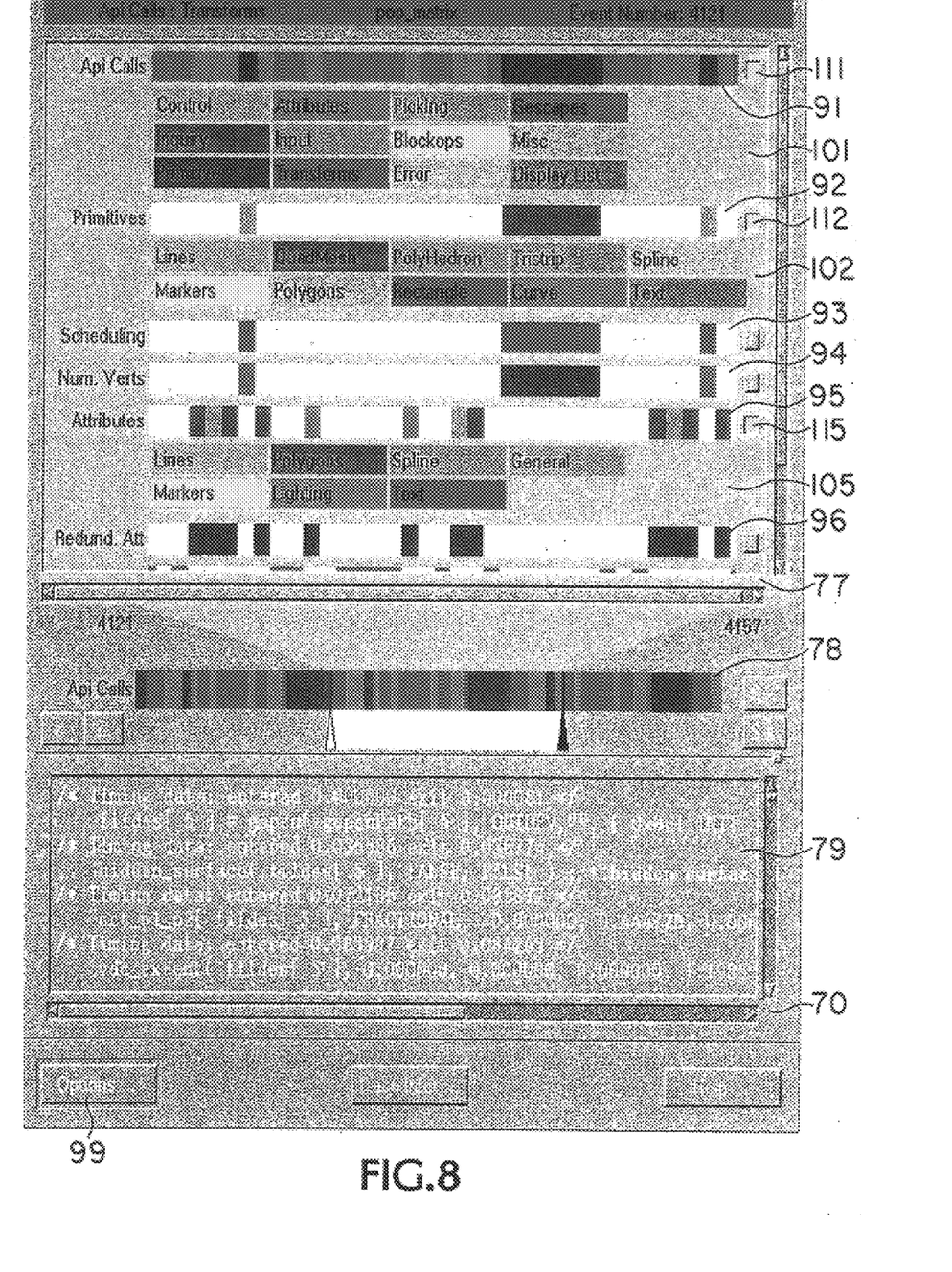

In FIG. 8, a legend toggle button 111 has been selected which has resulted in the display of a legend 101 for API call event stream 91. A legend toggle button 112 has been selected which has resulted in the display of a legend 102 for primitive event stream 92. A legend toggle button 115 has been selected which has resulted in the display of a legend 105 for attributes event stream 95.

Figure 9:
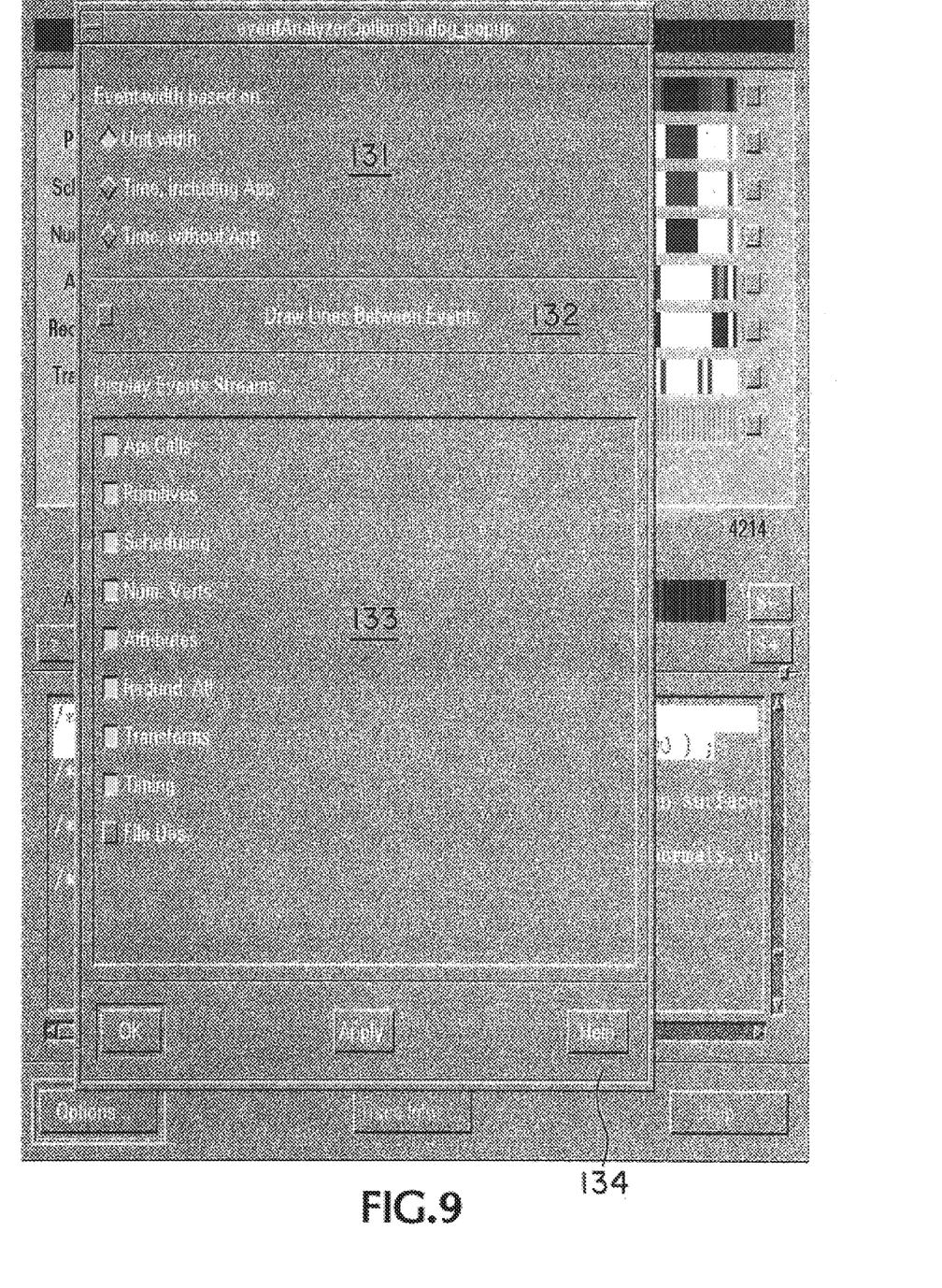
Figure 11:
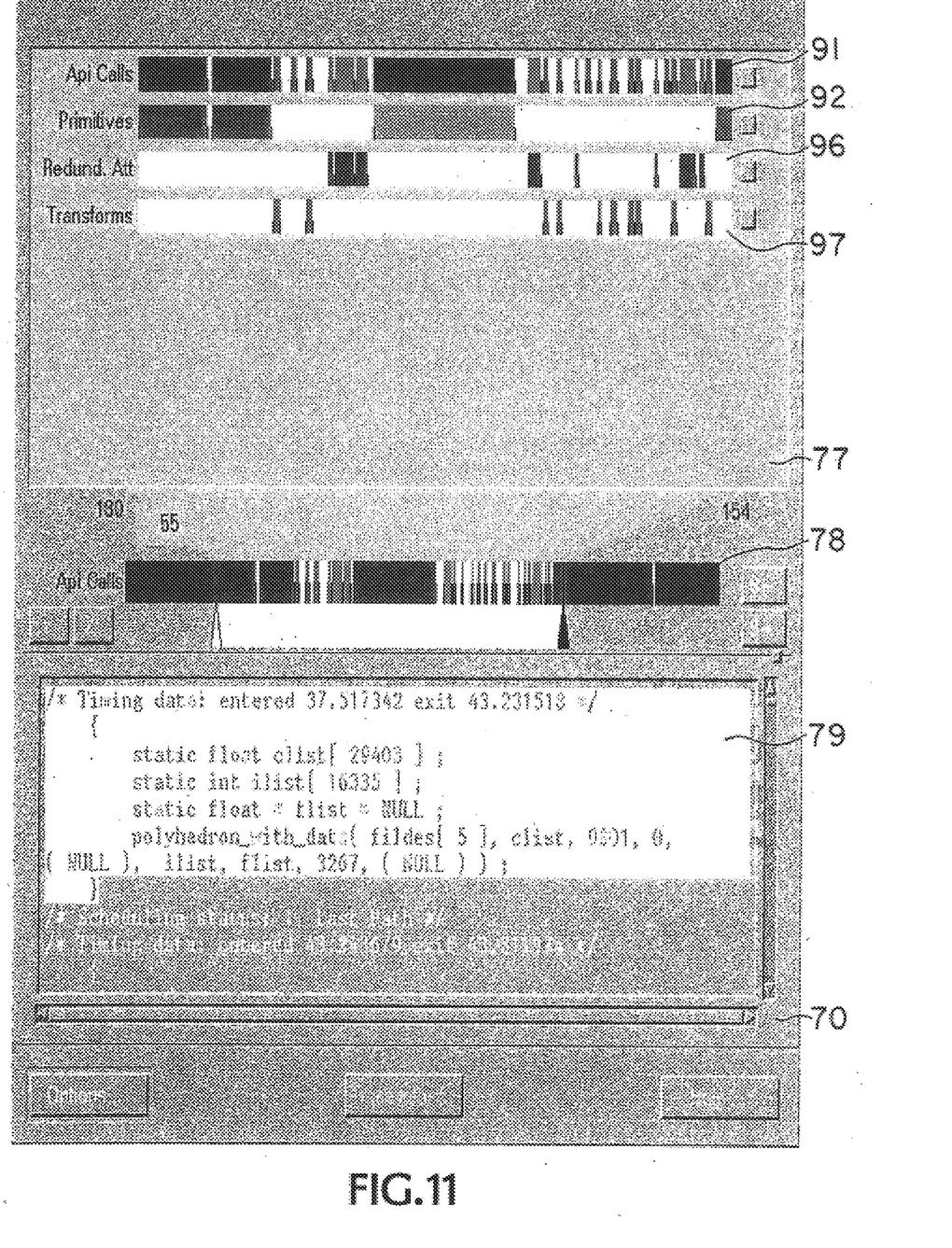
Figure 12:
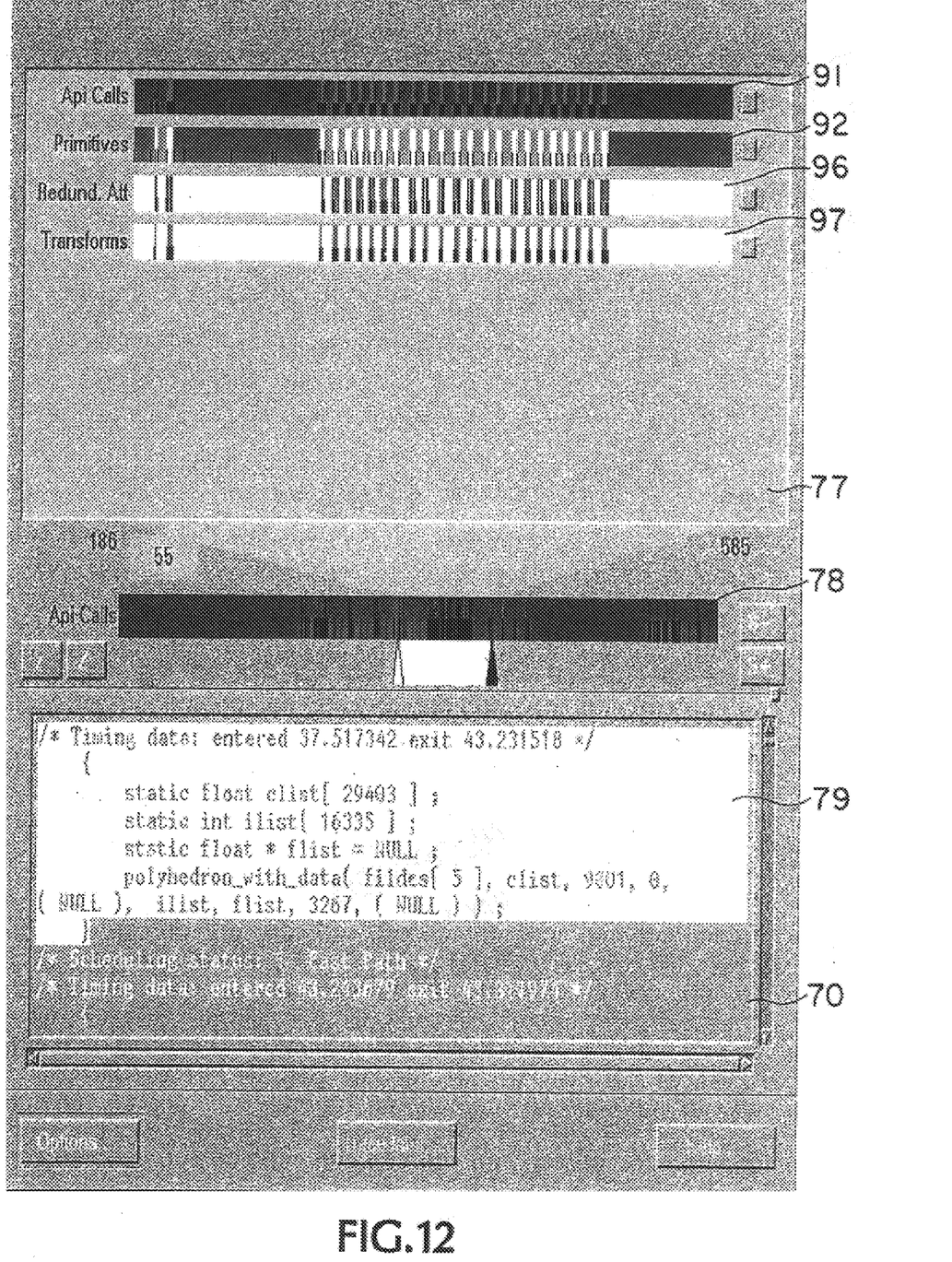

Selection of options button 99 results in the appearance of an options dialog window 134 shown in FIG. 9. Within options dialog window 134, a "unit width" section 131 shows how event widths within data event stream window 77 are determined. When "unit width" is selected, each event is shown to have a constant width. This is illustrated for example, by the width of events in data event stream window, as shown in FIGS. 7, 8 and 9. When "time including application" is selected, each event is shown to have a width based on execution time within graphics library 22. In addition, time within graphics application 21 is represented by relative spacing between events. This illustrated for example, by the width of events in data event stream window, as shown in FIG. 11. When "time without application" is selected, each event is shown to have a width based on execution time which includes execution time within graphics library 22. Time within graphics application 21 is not represented by relative spacing between events. This illustrated for example, by the width of events in data event stream window, as shown in FIG. 12.

Figure 13:
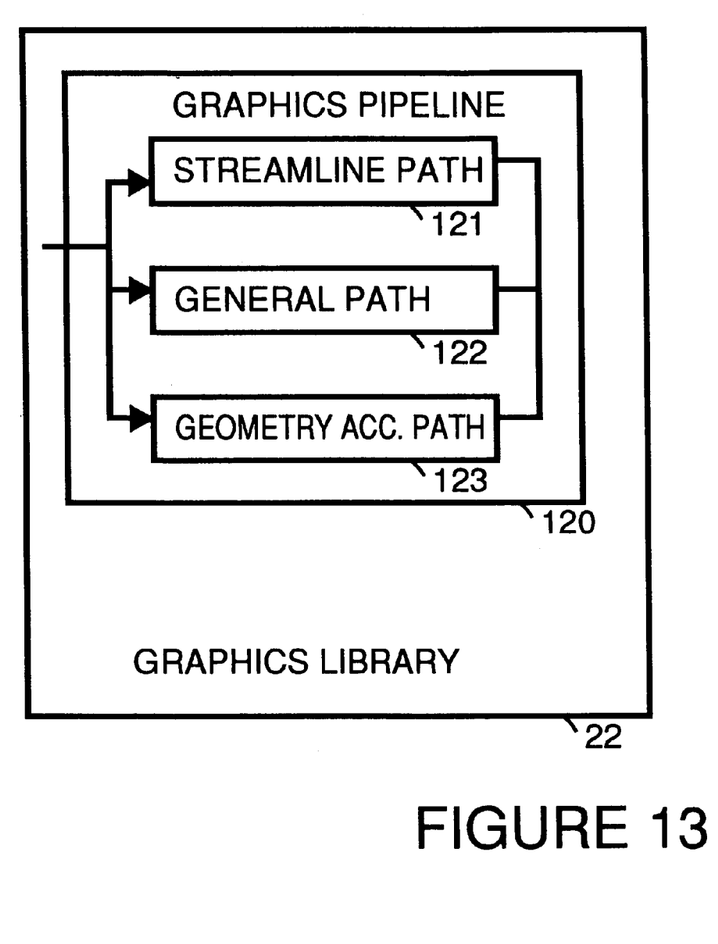
FIG. 13 is a simplified block diagram which illustrates operation of a graphics library.

Within options dialog window 134, a "draw lines between events" section 132 allows a user to select whether lines will be drawn between events. Lines drawn between events within data event stream window 77 is illustrated by FIGS. 11, 12 and 13. Also, within options dialog window 134, a "display event streams" section 133 allows a user to select which event streams will be displayed within data event stream window 77.

Figure 10:
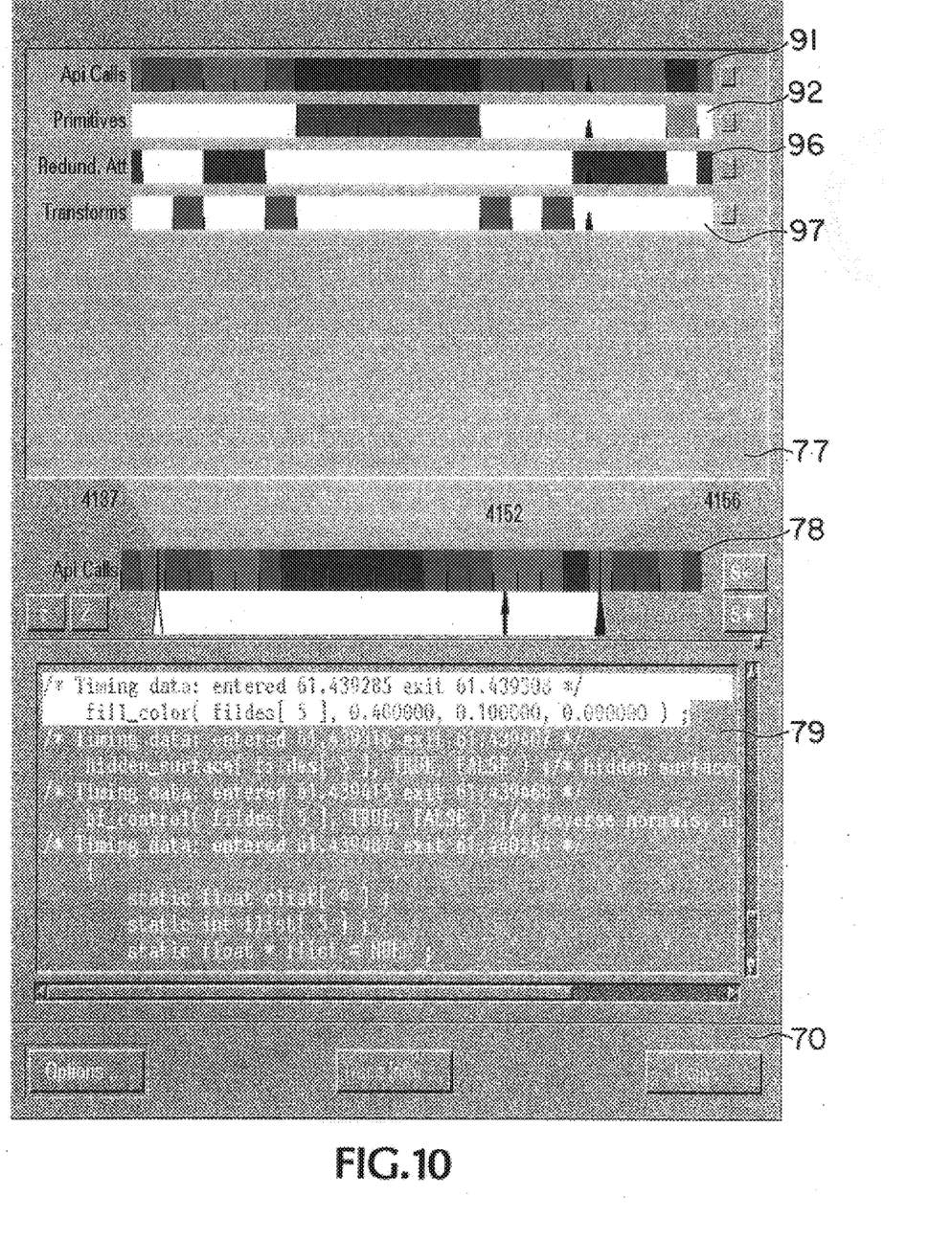

FIG. 10 illustrates fewer event streams being selected to appear within data event stream window 77. In addition, FIG. 10 illustrates lines drawn between events within data event stream window 77 and between events in reference stream 78.

FIG. 11 also illustrates fewer event streams being selected to appear within data event stream window 77 and illustrates lines drawn between events within data event stream window 77 and between events in reference stream 78. In addition, FIG. 11 illustrates width of event equaling "time including application", where each event is shown to have a width based on execution time within graphics library 22. In addition, time within graphics application 21 is represented by relative spacing between events.

FIG. 12 also illustrates fewer event streams being selected to appear within data event stream window 77 and illustrates lines drawn between events within data event stream window 77 and between events in reference stream 78. In addition, FIG. 12 illustrates width of event equaling "time without application", where each event is shown to have a width based on execution time which includes execution time within graphics library 22. Time within graphics application 21 is not represented by relative spacing between events.

FIG. 13 is a simplified block diagram which shows a graphics pipeline 120 within graphics library 22. Within graphics pipeline 121 there is a stream line path 121, a general path 122 and a geometry accelerated path 123. A selection can be made whether a single buffer or a double buffer is used to construct the image. When double buffer mode is used, one buffer is displayed while the other is being filled. In single buffer mode, only a single buffer is used so that a user can observe an image being built up one primitive at a time.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for providing information about operation of a software library, comprising the steps of:
    (a) accessing the software library by an application program,
        (a.1) collecting information about calls made by the application program into the software library; and,
    (b) for a portion of the calls in substep (a.1), performing the following substeps:
        (b.1) displaying a plurality of event streams for the portion of the calls, and
        (b.2) coloring events in each event stream displayed in substep (b.1) so that a color of each event displayed in each event stream encodes information about a call associated with the event, wherein a first call is represented as a separate event in each event stream in the plurality of event streams and coloring within each event stream encodes different information about the first call.

2. A method as in claim 1 wherein in substep (b.2) the first call is an application programming interface (API) call from a graphics application to a graphics library.

3. A method as in claim 2 wherein the graphics library is a three dimensional (3D) graphics library.

4. A method as in claim 1 wherein in step (b) an order of events in each event stream corresponds to an order of calls made by the application program into the software library in substep (a.1).

5. A method as in claim 1 wherein in step (b) locations, wherein the separate events which represent the first call are vertically aligned.

6. A method as in claim 1 wherein in step (b) the plurality of event streams are arranged to provide hierarchical information about the calls.

7. A method as in claim 6 wherein the application is a graphics application, wherein the first software library is a graphics library, and wherein in step (b):
    coloring of events in a first event stream from the plurality of event streams indicates classes of calls represented by the events in the first event stream, wherein one class of the classes of calls is a first class; and
    in a second event stream, events representing calls of the first class are colored according to subclass.

8. A method as in claim 1 additionally comprising the following step:
    (a) displaying a legend of colors for a first event stream in the plurality of event streams.

9. A method as in claim 1 wherein the portion of the calls for which a plurality of event streams is displayed is user selectable and user variable.

10. A method as in claim 1 wherein in step (b) each event within the plurality of event streams is of uniform width.

11. A method as in claim 1 wherein the application is a graphics application, wherein the first software library is a graphics library, and wherein in step (b) each event is graphically represented with a width proportional to processing time of a call represented by the event, the processing time including processing time within the graphics library.

12. A method as in claim 1 wherein the application is a graphics application, wherein the first software library is a graphics library, wherein in step (b) each event is graphically represented with a width proportional to processing time of a call represented by the event, the processing time including processing time within the graphics library, and wherein time within the graphics application is represented by relative spacing between events.

13. A method as in claim 1 wherein coloring of events within a first event stream in the plurality of event streams, indicates information about attributes of calls represented by the events.

14. A method as in claim 1 wherein coloring of events within a first event stream in the plurality of event streams, indicates information about attributes of parameters for calls represented by the events.

15. A method as in claim 1 wherein coloring of events within a first event stream in the plurality of event streams, indicates information about attributes of a state of the software library resulting from calls represented by the events.

16. A method as in claim 1 wherein coloring of events within a first event stream in the plurality of event streams, indicates information about attributes of behavior of the software library when receiving calls represented by the events.

17. A method as in claim 1 additionally comprising the following step:
(c) displaying in a text section, text describing at least some of the portion of the calls.

18. A method as in claim 1 additionally comprising the following step:
(c) in response to a user selecting a first event within a first event stream, displaying in text format a call represented by the event.

19. Storage media which stores software which, when executed on a computer system, performs a method for providing information about operation of a software library, the method comprising the steps of:
(a) accessing the software library by an application program,
  (a.1) collecting information about calls made by the application program into the software library; and,
(b) for a portion of the calls in substep (a.1), performing the following substeps:
  (b.1) displaying a plurality of event streams for the portion of the calls, and
  (b.2) coloring events in each event stream displayed in substep (b.1) so that a color of each event displayed in each event stream encodes information about a call associated with the event, wherein a first call is represented as a separate event in each event stream in the plurality of event streams and coloring within each event stream encodes different information about the first call.

20. Storage media as in claim 19 wherein in step (b) an order of events in each event stream corresponds to an order of calls made by the application program into the software library in substep (a.1).

21. Storage media as in claim 19 wherein in step (b) locations, wherein the separate events which represent the first call are vertically aligned.

22. Storage media as in claim 19 additionally comprising the following step:
(a) displaying a legend of colors for a first event stream in the plurality of event streams.

23. Storage media as in claim 19 wherein the portion of the calls for which a plurality of event streams is displayed is user selectable and user variable.

24. Storage media as in claim 19 wherein in step (b) width of each event is user selectable to be of one of the following:
uniform width;
width proportional to processing time of a call represented by the event, the processing time including processing time within the graphics library; and,
width proportional to processing time of a call represented by the event, the processing time including processing time within the graphics library and time within the graphics application being represented by relative spacing between events.

25. Storage media as in claim 19 additionally comprising the following step:
(c) displaying in a text section, text describing at least some of the portion of the calls.

26. An analyzer tool which encodes information about how an image is rendered comprising:
collecting means for collecting information about calls from an application program to a software library; and,
display means for displaying a plurality of event streams for a portion of the calls collected by the collecting means, the display means coloring events in each event stream so that a color of each event displayed in each event stream encodes information about a call associated with the event, wherein a first call is represented as a separate event in each event stream in the plurality of event streams and coloring within each event stream encodes different information about the first call.

* * * * *